June 29, 1965  J. G. LORD  3,191,859
VOTING MACHINE WITH CARD PUNCH MECHANISM
Filed Oct. 9, 1963  10 Sheets-Sheet 1
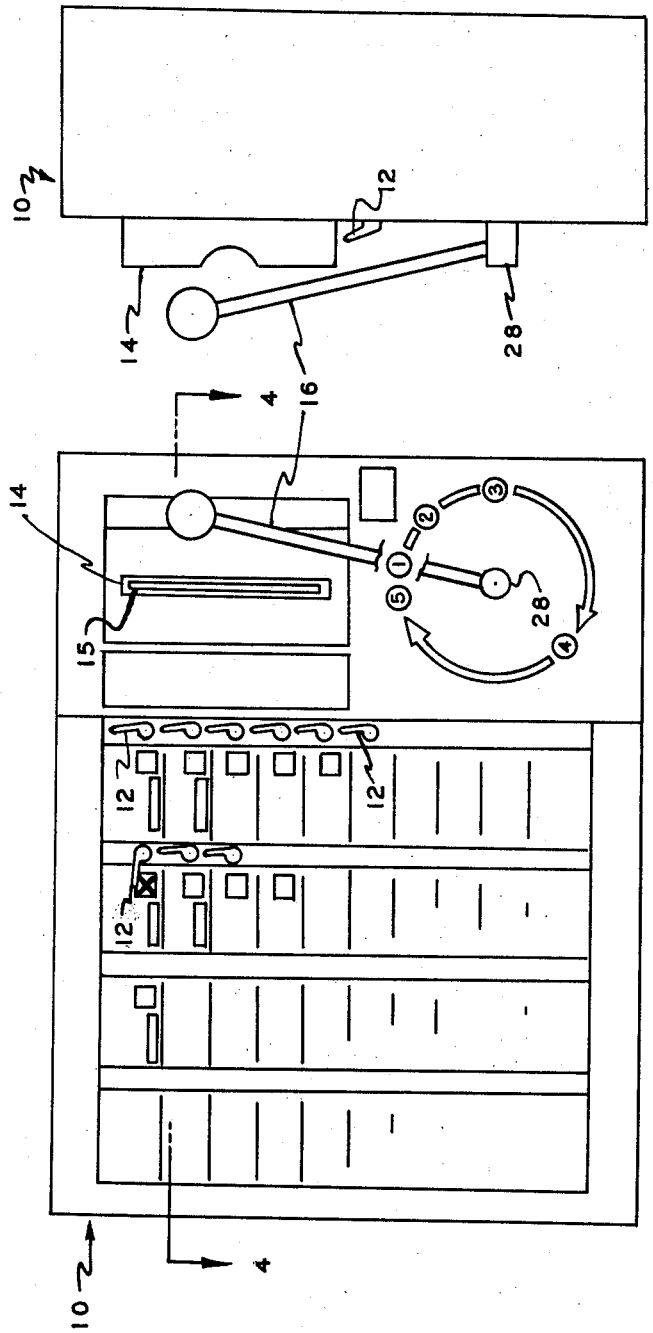
INVENTOR
JOHN G. LORD
BY
ATT'Y.

June 29, 1965

J. G. LORD 3,191,859

VOTING MACHINE WITH CARD PUNCH MECHANISM

Filed Oct. 9, 1963

INVENTOR.
JOHN G. LORD
BY
ATT'Y.

June 29, 1965  J. G. LORD  3,191,859
VOTING MACHINE WITH CARD PUNCH MECHANISM
Filed Oct. 9, 1963  10 Sheets-Sheet 3

INVENTOR.
JOHN G. LORD
BY
ATT'Y.

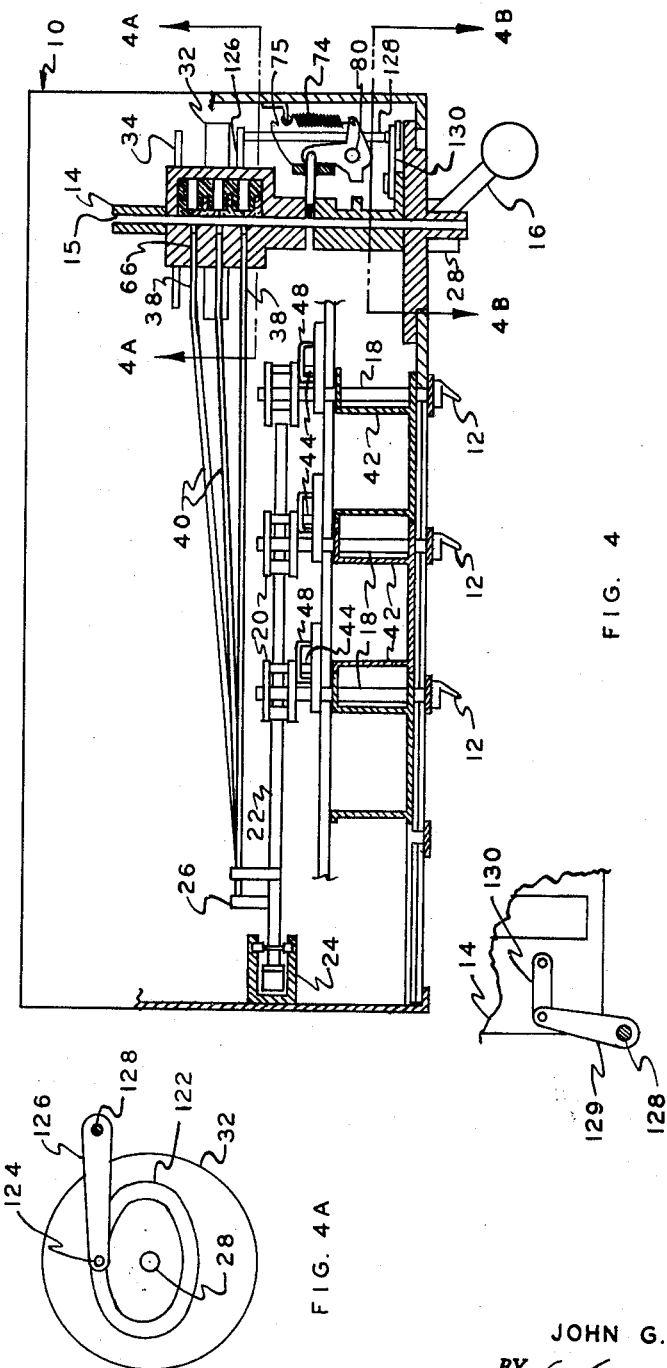

June 29, 1965   J. G. LORD   3,191,859
VOTING MACHINE WITH CARD PUNCH MECHANISM
Filed Oct. 9, 1963   10 Sheets-Sheet 6

INVENTOR.
JOHN G. LORD
BY
ATT'Y.

June 29, 1965 J. G. LORD 3,191,859
VOTING MACHINE WITH CARD PUNCH MECHANISM
Filed Oct. 9, 1963 10 Sheets-Sheet 7
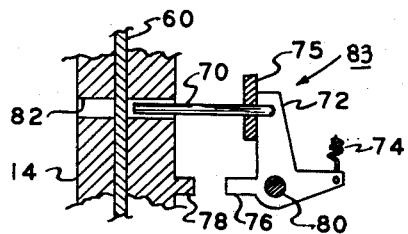
FIG. 13
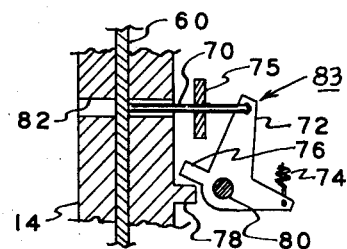
FIG. 14
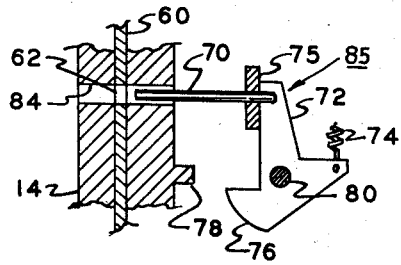
FIG. 15
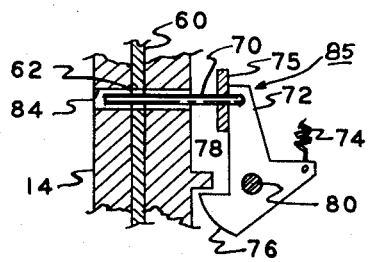
FIG. 16
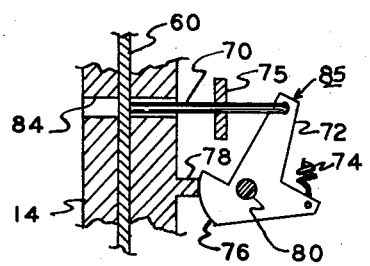
FIG. 17
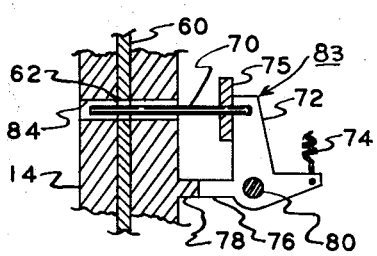
FIG. 18
INVENTOR.
JOHN G. LORD
BY 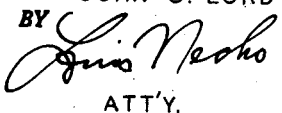
ATT'Y.

June 29, 1965  J. G. LORD  3,191,859
VOTING MACHINE WITH CARD PUNCH MECHANISM
Filed Oct. 9, 1963  10 Sheets-Sheet 8

INVENTOR.
JOHN G. LORD
BY
ATT'Y.

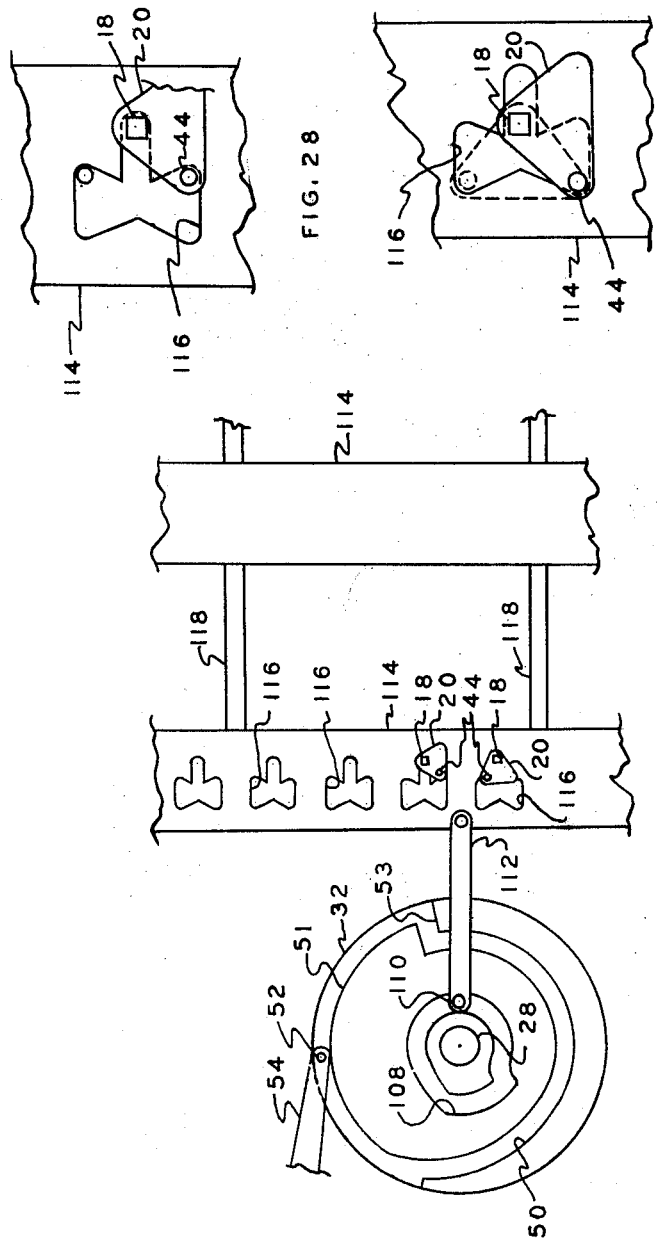

June 29, 1965     J. G. LORD     3,191,859
VOTING MACHINE WITH CARD PUNCH MECHANISM
Filed Oct. 9, 1963     10 Sheets-Sheet 10

INVENTOR
JOHN G. LORD
BY *Louis Necho*
ATT'Y.

United States Patent Office 3,191,859
Patented June 29, 1965

3,191,859
VOTING MACHINE WITH CARD PUNCH MECHANISM
John G. Lord, Swarthmore, Pa., assignor to The Shoup Voting Machine Corporation, a corporation of New York
Filed Oct. 9, 1963, Ser. No. 314,976
11 Claims. (Cl. 235—50)

This invention relates to voting machines, of the type disclosed in Shoup Patents 1,096,762 and 2,054,102.

One object of this invention is to provide improved machines of this kind.

As far as I am aware, conventional voting machines register the votes cast by individual voters and, at the conclusion of balloting, they give the simple totals of the votes cast for the respective candidates. For information as to how this is accomplished, reference may be had to the above mentioned patents.

It is therefore a further object of this invention to produce a voting machine which, in addition to rendering the totals of the votes cast for various candidates, also makes permanent records which can be quickly and accurately recounted, verified or analyzed so as to disclose information beyond that derived from mere totals.

A still further object of this invention is to produce an improved voting machine which a voter can operate in the same manner as a conventional voting machine, that is, a machine for the use of which no special training is needed.

A still further object is to produce an improved voting machine which makes a permanent record of the votes cast in the form of a coded punch card of the type which can be processed by electronic data processing machines, such for example, as those manufactured by International Business Machines Corporation.

A still further object is to produce a machine of the type set forth in which the vote casting mechanism is locked in voting or non-voting position during the card punching operation.

A conventional voting machine can only be used in the presence of one, and usually two attendants whose function is to guard against accidental mis-use or deliberate tampering.

It is therefore a still further object of this invention to produce an improved voting machine which has built-in safeguards to insure that no voter can vote more than once and which has safeguards against tampering, whereby the machine can be used without the need of any attendants.

Conventional machines are operated by linear, horizontal or vertical movements or by arcuate movements which initiate, or stop the various functions of the machine. Such hetro-directional movements do not lend themselves to automated programming.

A still further object is to produce a voting machine in which the insertion of a valid card "unlocks" or renders the machine available for use by the voter presenting the card and in which the insertion of an invalid card "locks" the voting machine to prevent voting until the invalid card is replaced by a valid one.

A still further object is to produce a voting machine the various mechanical operations of which are carried out by the unidirectional rotation of a circular member one rotation of said member being equal to one cycle of the machine.

A still further object of the invention is to produce a machine wherein the rotation of the cam which initiates, carries through and completes the operational cycle is conditioned upon casting of at least one valid vote. In other words, the cam can not be rotated unless at least one vote casting spindle is moved to, and left, in voting vote casting position.

A still further object is to produce an improved voting machine which is capable of executing the various operations set forth without interfering with the conventional vote recording operation of a voting machine of the type set forth in the Shoup patents referred to.

A still further object is to produce a machine wherein the manufacturer and assembly of the parts into units or sub assemblies is facilitated and made no less expensive.

The full nature of the invention will appear more fully from the detailed description which follows, taken in connection with the accompanying drawings forming a part of this application, and in which:

FIG. 1 is a front elevational view of a voting machine embodying the invention.

FIG. 2 is a side elevational view of the machine of FIG. 1.

FIG. 4 is a horizontal sectional view looking in the direction of lines 4—4 of FIG. 1.

FIG. 4A is a sectional view looking in the direction of line 4A—4A of FIG. 4.

FIG. 4B is a sectional view looking in the direction of line 4B—4B of FIG. 4.

FIGS. 13, 14 and 15 are fragmentary, enlarged views, partly in section and partly in elevation, and showing the mechanism which permits voting only when no hole is present in a particular area of the card, FIG. 14 being taken on line 14—14 of FIG. 3.

Figure 3:
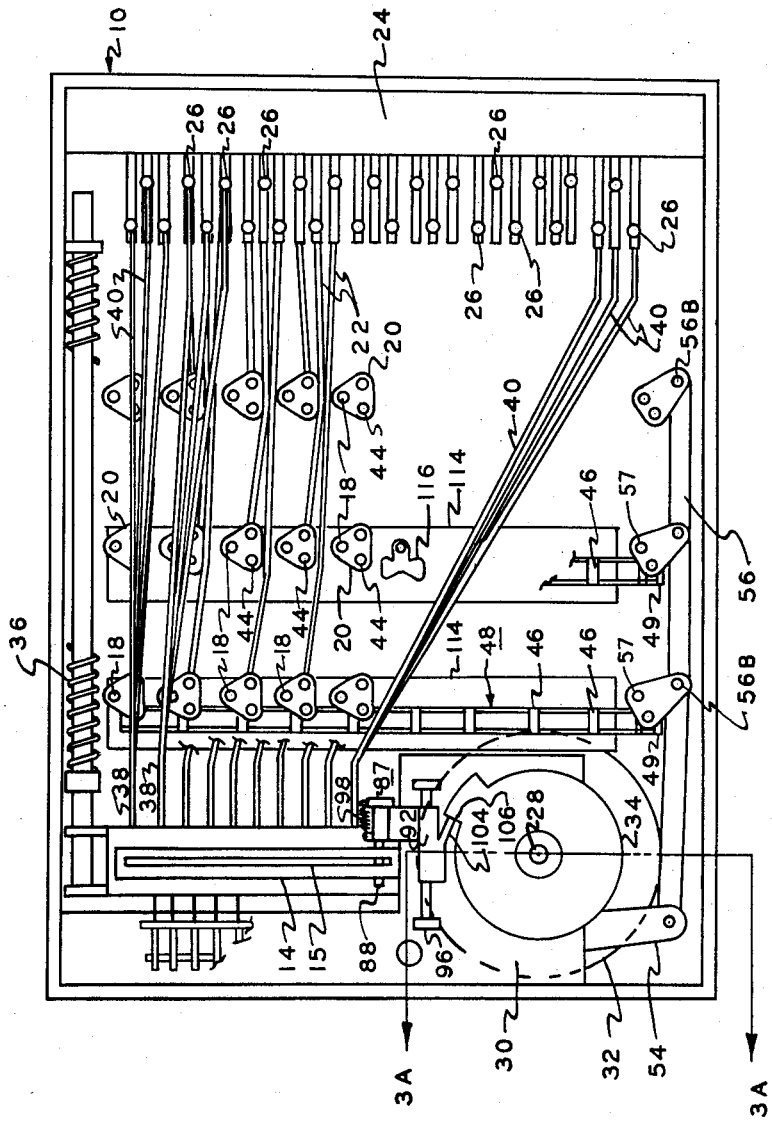
FIG. 3 is a rear elevational view of the machine of FIG. 1 with its rear upright wall removed to show the internal structure.

FIGS. 16, 17 and 18 are similar to FIGS. 13, 14 and 15 but showing the mechanism which permits votes to be cast only when a hole is present in a particular area of the data card, FIG. 15 being taken on line 15—15 of FIG. 3.

Figure 19:
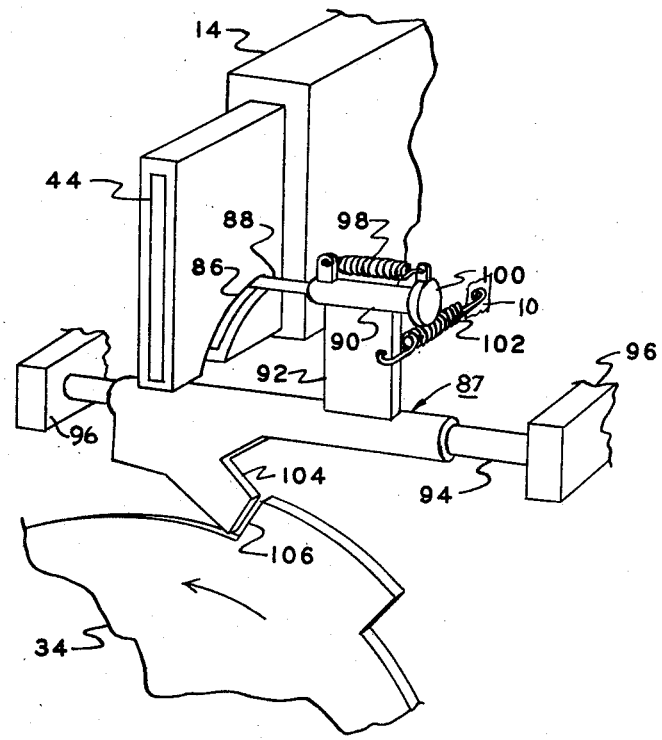
Figure 3A:
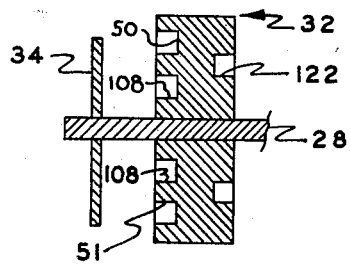
FIG. 3A is a sectional view looking in the direction of line 3A—3A on FIG. 3.

FIG. 19 is a perspective view of the mechanism for releasing the rotary cam upon insertion of the valid data card and for limting the rotation of the cam to one revolution for each card.

Figure 20:
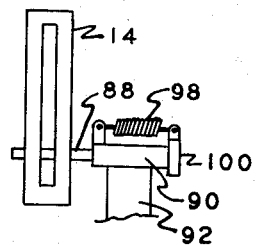
Figure 21:
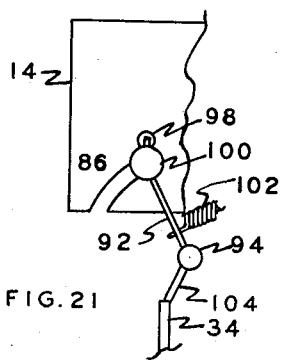

FIGS. 20 and 21 are rear and side elevational views, respectively, of the mechanism shown in the central portion of FIG. 19, and illustrating the positions of the parts prior to insertion of the data card.

Figure 22:
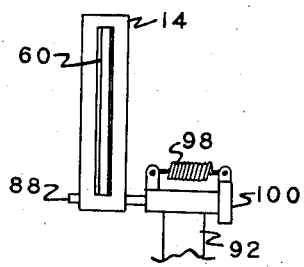
Figure 23:
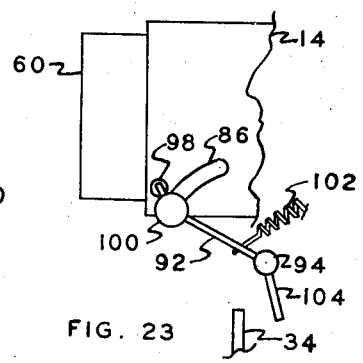

FIGS. 22 and 23 are views similar to FIGS. 20 and 21, but illustrating the positions of the parts after insertion of a data card.

Figure 24:
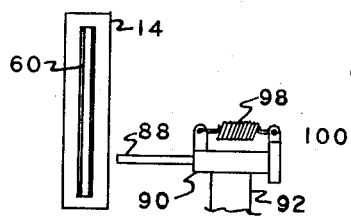
Figure 25:
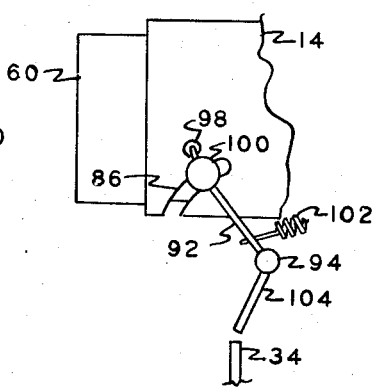

FIGS. 24 and 25 are also views similar to views 20 and 21, but illustrating the positions of the parts when the card is shifted during the voting operation.

Figure 26:
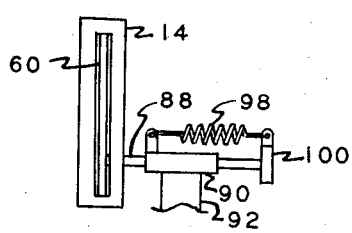

FIG. 26 is a view similar to FIG. 20, but illustrating the positions of the parts at the end of the voting operation and immediately prior to the data card being withdrawn from the card holder.

FIG. 27 is an elevational view, with some parts broken away and others shown in greater detail, of a mechanism for locking the voting levers while the individual ballot is being registered and the data card is being punched.

FIG. 28 is an enlarged view of a fragment of the parts shown in FIG. 27, showing in their unlocked position, the elements which coact to lock the selection levers during the recording of the balloting information; and the punching of the card.

FIG. 29 is a view similar to view 28, but showing the same elements in the unlocked position, said elements being shown in voted position by broken lines and in unvoted position by solid lines, respectively.

Figure 30:
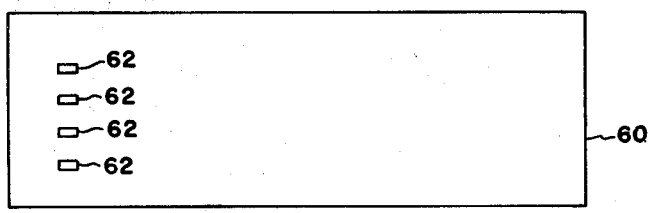

FIG. 30 is a plan view of a data card having binary code information placed thereon, in the form of punched rectangular holes.

Figure 31:
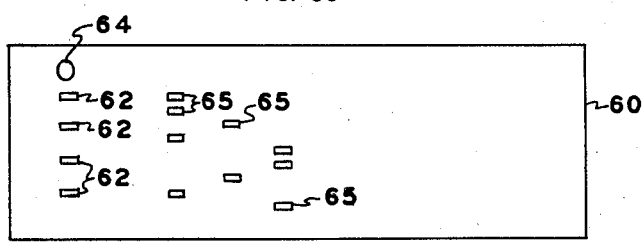
Figure 32:
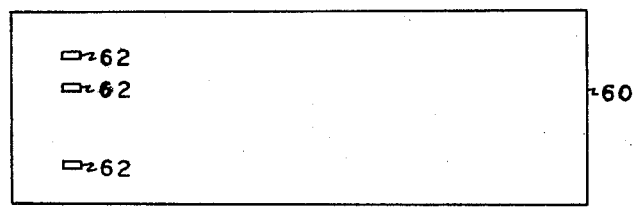
Figure 33:
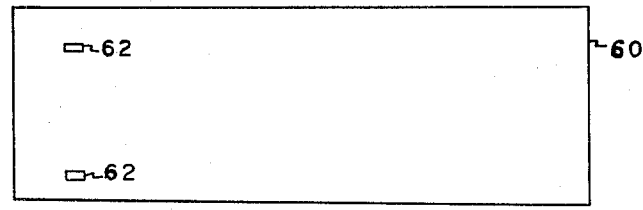

FIG. 31 is a view similar to FIG. 30 showing the same card with additional rectangular holes punched therein as a record of the ballot information and also a punched circular hole to signify that the data card has been employed for voting, and FIGS. 32 and 33 are views similar to FIG. 30 showing variations in the locations of the punched rectangular holes.

The voting machine diagrammatically shown in FIG. 1 comprises a cabinet 10 having on the face or the first wall thereof which faces the voter, the desired number of columns of voting handles or keys 12 and a receptacle 14 having slot 15 for insertion of data card. Also associated with said front wall the voter-manipulated operating handle 16 which is movable, in clockwise direction, through one full revolution to initiate and complete the operation as set forth.

Each voting key 12 is mounted on the front end of a conventional spindle 18 at the opposite end of which is mounted a generally triangular butterfly plate 20. Each butterfly plate 20 is rigidly connected at one corner thereof to voting spindle 18 and it is pivotally connected at another corner thereof to a pull strap 22. The pull straps 22 associated with any group or row of keys 12 extended to an interlock 24 which is of the type disclosed in the Shoup patents aforesaid. Pull straps 22 are provided with studs 26, FIG. 3, which will be hereinafter further referred to. As will be seen from FIGS. 1 and 3, the main voting handle 16 extends radially by a horizontal shaft 28 which is rigidly secured to rotary disc 30 which is provided with a main cam 32 and an auxiliary cam 34 which are hereinafter further referred to. It will also be seen from these views, that a return spring 36 is employed yieldingly to resist horizontal movement of the card receptacle 14, and that each pull strap 22 is provided with a card punch 38, associated with punch passageway 39, and suitable links 40 operatively connecting its card punch 38 and its previously referred to stud 26.

As best seen in FIG. 4, each voting spindle 18 has associated with it a standard handle return member 42 which is raised when the corresponding voting key 12 is turned to vote-casting position and which, when lowered, resets the voting key.

Figure 5:
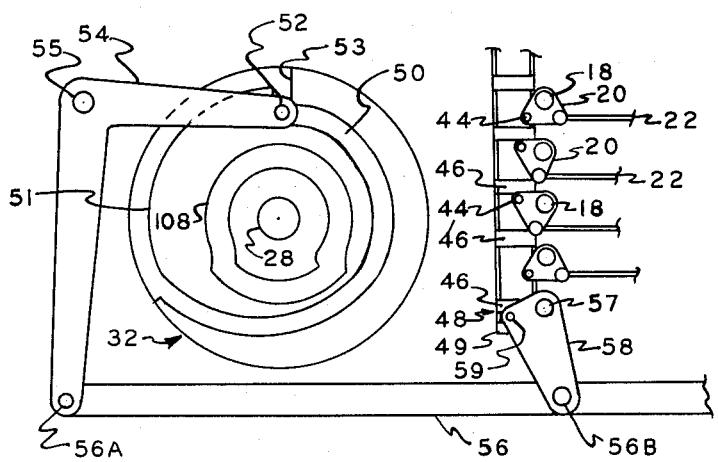
FIG. 5 is an enlargement of the lower left hand corner of FIG. 3 with some parts broken away and other parts shown in greater detail to illustrate and showing the two central voting spindles in voted position.

Referring now to FIGS. 3, 4, 5 and 6, each butterfly plate 20 also has in a corner thereof, a pin 44 positioned between the vertically spaced rungs 46 of a ladder 48, there being one ladder 48 for each vertical column of butterfly plates in the position 20. FIG. 5 ladder 48 is freely shiftable up and down by rotation of voting keys 12. But when cam 32 is in the position 6, follower 52 rides on low cam surface 50 and rocks lever 54 in counter-clockwise direction as viewed in FIG. 6, to bell crank 58 about point 57 to pull ladder 48 down to its lower position in which voting keys 12 are locked in unvoted position, when ladder 48 is locked in its lower position, follower 52 is riding on high cam surface 51.

Follower 52 is carried at one end of an L-shaped lever arm 54, pivotally mounted at 55, so as to transmit motion from the other end of lever 54 to a horizontal link bar 56 and thence through a bell crank 58, pivotally mounted at 57, to ladder 48. Link bar 56 is pivotally connected to arm 54 and crank 58 at 56a and 56b, respectively. Bell crank 58 has a drive pin 59 which is linked to ladder 48, in driving relationship therewith, between a lowermost auxiliary rung 49 and the rung 46 immediately above it. There is one bell crank 58 for each ladder 48, all connected to link bar 56 for movement in unison thereby.

Figure 6:
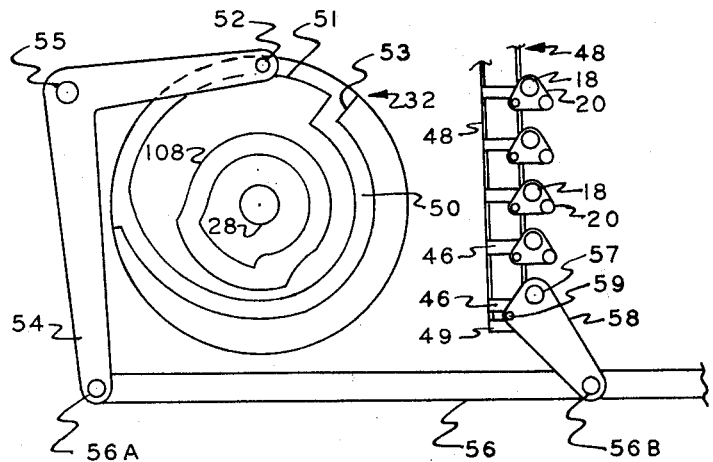
FIG. 6 is similar to FIG. 5, but illustrating the parts immediately after the voting keys have been reset but before the machine is readied for further use.

It will be noted from FIG. 6 that when follower 52 rides on the outer peripheral surfaces 51 of cam 32 the ladder 48 is held in lower position and the spindles 18 are locked in unvoted position against turning movement. However, when cam 32 is advanced in counterclockwise direction the follower 52 comes into registry with radial slot 53, and here follower 52 is free to move inwardly and outwardly along a radial line, and ladder 48 is free to be moved upwardly by the pins 44 of plates 20 as a result of turning movement of the spindles 18. It should be noted that cam 32 cannot be advanced while follower 52 is in outward position because follower 52 engages a cam surface at the upper end of slot 53. It should also be noted here that movement of any one spindle 18 to voted position advances its associated counter 42 and, at the same time, shifts ladder 48 upwardly and moves follower 52 inwardly along radial slot 53 to the position of FIG. 5. After follower 52 is in its FIG. 5 position, it is possible to move ladder 48 downwardly and follower 52 outwardly by means of moving spindle 18 back to unvoted position. Also, follower 52 in its FIG. 5 position serves to lock cam 32 against reverse or clockwise rotation, as viewed in FIG. 5. Hence, once a key 12 is moved from unvoted position toward voted position, the voter is free to change his mind as to selections while preparing his ballot; but, in order to advance the handle 16 unidirectionally through one full revolution, a voter must cast a positive vote and then further advance the voting handle 16 through the voting cycle before the machine is ready for the next voter. As will be explained later, completion of the voting sequence involves punching a data record card to record the ballot thereon. And continued clockwise movement of cam 32 moves follower 52 into groove 50, and gradually urges follower 52 outwardly in order to move ladder 48 downwardly and thereby reset the plates 20 and keys 12 in ready position as follower 52 travels between the low camming surface of groove 50 and the high camming surface of outer peripheral surface 51. As follower 52 travels along the high camming surface, the voting keys 12 and spindles 18 are again held in locked position by the ladder 48.

*Data record card*

Brief reference is made to FIG. 30 wherein a data record card 60 is shown having four rectangular validating holes 62 punched therein. Reference is also made to FIG. 31 wherein card 60 has a circular hole 64 punched in its upper left-hand corner, and there are a plurality of rectangular holes 65 which have been therein to record a ballot. A circular hole 64 signifies that a particular data record card 60 has been used previously to cast a ballot.

*Card inspecting mechanisms*

According to the present invention, there are two separate mechanisms for inspecting a data record card 60 inserted into a voting machine. One mechanism, designated by the numeral 81 in FIGS. 7 to 10, inspects the card 60 to ensure that it has not been used previously for voting. The other mechanism, in two forms designated by the numerals 83 and 85, the subject of FIGS. 13 to 18, performs a validity inspection of the card to ensure that it contains punched binary code information indicating that the bearer is eligible to vote. And a card must satisfy these mechanisms before a ballot can be cast.

Preparatory to discussing these inspection mechanisms, it will be noted, while again making reference to FIGS. 3 and 4, that card receptacle 14 holds data record card 60 and is shiftable first to the left and then to the right during a voting operation, as viewed from the rear of the machine and in the figures of the drawings illustrating the various punching and sensing mechanisms in detail. In FIGURES 3, 3A, 4A and 4B, the mechanisms for shifting the card receptacle 14 is illustrated.

Figure 7:
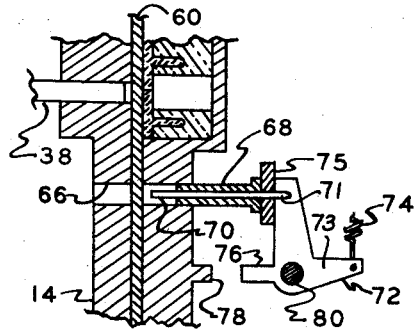
FIGS. 7, 8, 9 and 10, are enlarged, fragmentary views, partly in section and partly in elevation, showing in detail the mechanism for punching a hole in a card to indicate that a vote has been cast and for sensing and responding to the existence of such a hole prior to such punching operation, to prevent a second use of a voting card which has already been punched in a previous voting operation.

In the FIG. 7 position of the mechanism 80 for detecting whether or not a record card 60 had been used previously for voting, it will be noted that a cylindrical bore 66 extends horizontally through the card receptacle 14, this bore being directed, for example, at an upper left-hand corner of the card 60. Disposed within the bore 66 and extending into the card receptacle 14 from one side thereof is a card punch 68 of circular cross section provided with an axially extending passageway in which is received a sensing pin 70. One end of pin 70 extends beyond punch 68 toward card 60, and the other end thereof is linked at 71 to a sensing arm 72. The latter is pivotally mounted on a shaft 80 and it is urged in counterclockwise direction, as viewed in FIG. 7, by the bias of a coil spring 74 connected to an extension 73 thereon, into engagement with a stop plate 75. Arm 72 and card receptacle 14 are provided with respective abutment members 76 and 78 which are aligned in registry with each other in the FIG. 7 position of the mechanism. If card 60 already has a circular hole 64 therein, sensing pin 70 will meet no resistance as card receptacle 14 is moved to the right, as in FIG. 8, with the result that abutment members 76 and 78 will engage and prevent further rightward movement of the receptacle 14. On the other hand, if there is no hole at this location in card 60, the resistance met by sensing pin 70 will pivot arm 72 clockwise, as in FIG. 9, so as to move abutment members 76 and 78 out of registry and thereby permit receptacle 14 to move to the extreme righthand position of FIG. 10. In this situation a circular hole 64 is punched by punch 68 from card 60, at a point in the sequence of operations immediately preceding the unlocking of the voting spindles 18.

Figure 8:
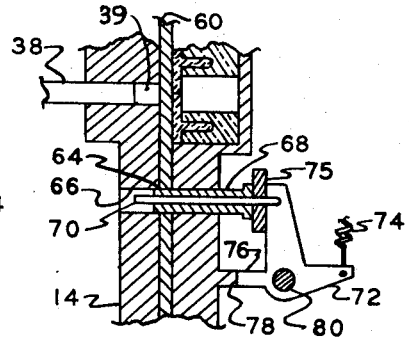
Figure 9:
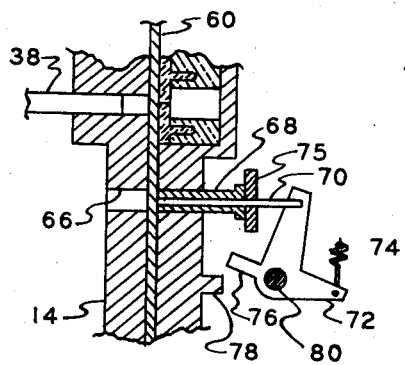
Figure 10:
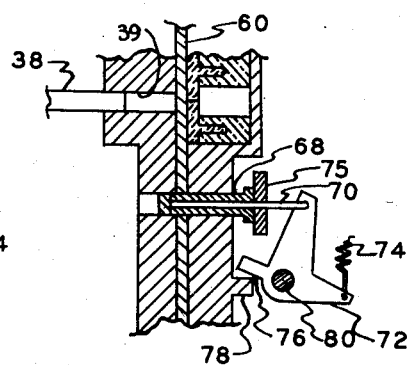

The FIG. 8 position of the hole sensing mechanism 81 corresponds, or nearly corresponds, to the FIG. 6 position of the cam 32 and its associated follower 52. In this FIG. 8 situation, the voter cannot vote, but must return the handle 16 to start position, designated by the numeral 1 in FIG. 1, and then remove his card 60. However, when the hole sensing mechanism 81 is in the position of FIG. 10, the program cam 32 has advanced to the corresponding position of FIG. 5 wherein follower 52 registers with the radial slot 53 in cam 32; and hence the voter may proceed to prepare his ballot by turning selected keys 12 and thereby moving associated card punch numbers 38 rightward, from the position of FIG. 10 to the position of FIG. 11, during which time the card receptacle 14 remains in the extreme right-hand position of FIG. 10. Further advancement of the main voting handle 16, while the card punch members 38 are in extended position, moves the card receptacle 14 toward the left, thereby accomplishing punching of a rectangular hole 65 from the card 60, as shown in FIG. 12. And still further advancement of the handle 16 retracts the card punch members 38 and returns the sensing arm 72 to the position of FIG. 7. Thus, information as to the individual selections made by the ballot are permanently recorded in punched code on the card 60.

Still another card inspecting mechanism, in two forms thereof designated by the numerals 83 and 85, is shown in FIGS. 13 to 18. It is the function of the sensing mechanisms 83, 85 to determine if a valid card 60 has been presented bearing the proper binary code punches, which for a given voting machine may be punched as shown in FIG. 30, or variations thereof, such as shown in FIGS. 32 and 33. These forms of sensing mechanism operate at the same time in the voting cycle as does the hole sensing mechanism 81 of FIGS. 7 to 10. One form of the code sensing mechanism, shown in FIGS. 13, 14 and 18, and designated by the numeral 83, stops the rightward movement of the card receptacle 14 if the data card 16 has a hole where there should be no hole; and the other form of the code sensing mechanism, shown in FIGS. 15, 16 and 17 and designated by the numeral 85, stops the rightward movement of the card receptacle 14 if there is no validating hole 62 where there should be one. Thus, the form of sensing mechanism 85 is pivotally mounted on common shaft 80 in position to register with a validating hole 62, there being one such sensing mechanism 85 on the common shaft 80 for each of the predetermined numbers of validating holes 62 required for a valid card 60; and in intermediate positions pivotally mounted along shaft 80 a number of sensing mechanisms 83 are provided. The form of mechanisms 83 is operatively associated with a bore 82 in the card receptacle 14, and it is structurally and operatively similar to the hole sensing mechanism 81 of FIGS. 7 to 10, except that it has now punch 68; and, therefore, like reference numerals are employed to designate similar parts of mechanisms 81 and 83. As shown in FIG. 13 the card receptacle 14 is in the extreme left-hand position, with abutment members 76 and 78 being in alignment. In FIG. 14 the sensing pin 70, having contacted an imperforate portion of card 60, is pushed to the right as the card receptacle moves rightward, thereby pivoting arm 72 in clockwise direction and moving abutment members 76 out of registry with abutment member 78, and thereby permitting card receptacle 14 to be moved to the extreme right-hand position shown in this view. In FIG. 18, sensing pin 70 has passed through an invalid hole in card 60, with the result that abutment members 76 and 78 remain in alignment and prevent card receptacle 14 from moving to the extreme right-hand position and halting the operation of the machine.

The form of sensing mechanism 85, shown in FIGS. 15, 16 and 17, is operatively associated with a bore 84 in card receptacle 14, and it also is structurally similar to the hole sensing mechanism of FIGS. 7 to 10, with the exeception of abutment member 76 and the absence of a punch 68; and, therefore, like reference numerals are also employed to designate corresponding parts of mechanisms 81 and 85. Since it is the function of this form of mechanism 85 to prevent movement of the card receptacle 14 to the extreme right-hand position when there is no validating hole 62 in card 60, the abutment member 76 is out of registering alignment with abutment member 78 when the card receptacle 14 is in the extreme left-hand position of FIG. 15. When a validating hole 62 is present in card 60, sensing pin 70 passes therethrough as the card receptacle is moved toward the extreme right-hand position of FIG. 16 without altering the position of the arm 72 or the abutment member 76. However, in the absence of a validating hole 62, arm 72 is pivoted about shaft 80 in clockwise direction and abutment member 76 is moved into the path of abutment member 78, as shown in FIG. 17, thereby preventing further movement of card receptacle 14 toward the right.

It can be seen from the foregoing that when a valid data card 60 is inserted into the card receptacle 14, it is possible to move handle 16 beyond the position of FIG. 1 designated by the numeral 2 so as to rotate cam 32 to the position of FIG. 5 wherein the spindles 18 are unlocked for voting. But if an invalid card is inserted in card receptacle 14, it will not be possible to move the handle 16 far enough to unlock the spindles 18; and a voter with an invalid card must move handle 16 back to the position designated by the numeral 1 and remove his card.

Cam locking and unlocking device

Referring now to FIG. 19, a device 87 is provided for locking the multiple rotary cam 30 and handle 16 against rotary movement unless a data card 60 is received in the card receptacle 14. In addition, the device 87 limits the rotary movement of the multiple rotary cam 30 to one full revolution per card 60. As can be seen in FIGS. 19, 20 and 21, a curved slot 86 is formed in the card receptacle 14 through the entire thickness thereof. This slot 86 extends upwardly and forwardly through the card receptacle 14, and it is adapted to receive a transversely extending card sensing plunger 88 of device 87. Plunger 88 is slidably received in a tubular end portion 90 of an upright arm 92 pivotally mounted on a horizontal shaft 94 carried between a pair of bearing blocks 96. The card sensing plunger 88 is biased to the left, as shown in the drawings, by means of a tension spring 98 secured at one end to the tubular end portion 90 at the other end to an enlarged head portion 100 of plunger 88. Enlarged head portion 100 bears against the right-hand end of the tubular end portion 90 so as to limit the extent to which plunger 88 can be moved to the left. Another tension spring 102 is connected to the arm 92, and it extends forwardly for connection at the front of the machine, so as to bias the arm 92 toward the front of the machine, and thereby bias the plunger 88 against the closed end of the curved slot 86. Formed integrally with the shaft 94 and extending downwardly therefrom, is a lock tab 104 which, in the positions of the parts shown in FIG. 19, is disposed in the path of movement of an abutment surface 106 on the periphery of the auxiliary cam 34.

The bias of springs 98 and 102 maintain the plunger 88 in position in slot 86 so as to be in the path of movement of any data card 60 inserted in to the card receptacle 14; and, at the same time, lock tab 104 is positioned in blocking movement with respect to the auxiliary cam 34. See FIGS. 20 and 21. The insertion of a data card 60 into the card receptacle 14 overcomes the bias of spring 102 and moves plunger 88 through an arcuate path in slot 86 to the positions of the parts shown in FIGS. 22 and 23, wherein it will be noted that the lock tab 104 no longer blocks auxiliary cam 34 against rotary movement.

It will be recalled that rotation of the main voting handle 16 during registration of a ballot moves the card receptacle 14 first to the left, as shown in FIG. 24, and then to the right as shown in FIG. 26. Leftward movement of the card receptacle 14 to the position of FIG. 24 causes card 60 to disengage the plunger 88, with the result that arm 92 is moved in clockwise direction, as viewed in FIG. 25, by the bias of tension spring 102. Thus, arm 92 is returned to upright position, and at the same time, lock tab 104 is returned to blocking position with respect to the path of movement of the abutment surface 106 on auxiliary cam 34. As shown in FIG. 26, when card receptacle 14 is moved rightward into original position, a broad flat surface of data card 60 engages the tip of plunger 88 and moves plunger 88 rightward against the bias of tension spring 98. After each individual ballot has been cast, the data card 60 is subsequently withdrawn and spring 98 moves plunger 88 to the left through the slot 86 of the now empty card receptacle 14, with the result that the parts of the device 87 are returned to the position of FIG. 20 for the start of a new voting cycle. It is to be noted that the return of the lock tab 104 to the blocking position of FIG. 25 is effected before the auxiliary cam 34 has had an opportunity to complete one full revolutionary movement, so that by this arrangement the multiple rotary cam 30 cannot be rotated for more than one full revolution per card 60.

Spindle locking device of FIG. 27

Provision is also made for locking the spindles 18, either in voted or unvoted position, during that portion of the machine operation in which the main voting handle 16 is being rotated between positions designated by the numerals 3 and 4 in FIG. 1, while follower 52 is in groove 50 of cam 32; and it is during this portion of the operation that data card 60 is being punched and the standard counters 42 are being shifted to register the ballot. This is accomplished by means of a mechanism shown in FIG. 27 and which is driven through main program cam 32 by the voting handle 16. Cam 32 is provided with a groove 108 in which is received a follower 110. Follower 110 rides in groove 108 and transmits motion in horizontal direction through a drive linkage 112 to spindle lock plates 114, there being one plate 114 for each column of spindle 18. Drive linkage 112 is pivotally connected at opposite ends thereof to the follower 110 and the neighboring spindle lock plate 114. The configuration of the groove 108 is such that it moves the drive linkage 112 and spindle lock plates 114 from their positions shown in FIG. 27 first to the right, then it holds the linkage 112 and lock plates 114 in this position for a short period, and then moves them leftward back to their original position.

It will be recalled from FIGS. 3 and 4 that there is one spindle lock plate 114 for each vertical column of spindles 18 and that when ladder 48 is in an uppermost position the pins 44 of the butterfly plates 20 are movable in an arcuate path between the rungs 46 of the ladder 48. Thus, the butterfly plate is movable from the solid line position of FIG. 29 to the dotted line position of FIG. 29 when its associated voting key 12 and spindle 18 have been turned in making a voting selection. Accordingly, pin 44 will either be in the solid line position or in the dotted line position of FIGS. 28 and 29 after the voter has made his selection. It is possible that a voter would attempt to change his mind as the ballot is being registered and the card 60 is being punched; and, therefore, each pin 44 is held captive within a cutout or hole 116 of hourglass configuration formed in the spindle lock plate 114 when lock plate 114 is in the extreme right-hand position of FIG. 29. It will also be noted that each cutout or hole 116 has a horizontal slot portion which permits lock plate 114 to move freely relative the spindles 18. Thus, when the parts of the mechanism are in the positions shown in FIG. 28, the spindle 18 and butterfly plate 20 are movable in clockwise direction from the solid line position shown until pin 44 has moved through an arcuate path into engagement with a portion of lock plate 114 bordering the upper right-hand corner of the cutout or hole 116. And changes in the positions of the keys 12 and butterfly plates 20 can be affected so long as the spindle lock plates 114 remain in the left-hand position of FIG. 28; but as soon as the voting handle 16 has been rotated further so as to rotate main cam 32 in counterclockwise direction, as viewed in FIG. 27, the spindle lock plates 114 will be moved toward the right until the parts assume the positions shown in FIG. 29; and in this position the pins 44 will be held captive in either the upper or lower left-hand corners of the holes 116 until after the ballot has been registered, the card 60 has been punched, and the spindle lock plates have been moved leftward to the original position of FIGS. 27 and 28. It will be noted that the spindle lock plates 114 move in unison when driven by the linkage 112, because they are rigidly connected together by upper and lower horizontally extending members 118.

Card receptacle shifting mechanism

Reference is made to FIGS. 3, 4, 4A, and 4B for a description of the mechanism which reciprocates card receptacle 14 horizontally in response to rotation of handle 16. As shown, main cam 32 is provided on the front face thereof with a groove 122 operatively associated in camming relationship with a follower 124 carried at one end of a bell crank 126. The latter is pivotally mounted on a pivot shaft 128 and connected by a link bar 130 to card receptacle 14.

During one full revolution of main voting handle 16 the card receptacle 14, as viewed in FIG. 4, is moved first to the right, and then to the left, in response to rotation of cam 32 and transmission of motion from camming groove 122 through bell crank 126, pivot shaft 128, a second bell crank 129, and link bar 130 to card receptacle 14.

*Operation*

The voting machine of the present invention is ready for operation when the main voting handle 16 is in the position designated by the numeral 1, as shown in FIG. 1. In this position of the voting handle 16, the other parts are in the positions shown in FIGS. 3 and 4. It will be noted especially that the card receptacle 14 is in the extreme left-hand position when viewed frontally from above, as in FIGS. 4, 7, and 11, and 13 and 15. Unless a valid data card 60 is inserted in receptacle 14, it is not possible to move the handle 16 beyond FIG. 1 position designated by the numeral 2 because the aligned abutment members 76 and 78 of the hole sensing mechanism will limit rightward movement of the card receptacle 14. Also, it is not possible to turn any of the voting keys 12 because the spindles 18 are locked against rotation as a result of the pins 44 of the butterfly plates 20 being engaged by the rungs 46 of the ladder 48. Ladder 48 is in its lowermost position.

Insertion of a data card 60, even an invalid one, into receptacle 14 moves plunger 88 out of slot 86, illustrated in FIG. 19, and at the time moves lock tab 104 out of blocking position with respect to the abutment surface 106 of auxiliary cam 34. Thus, the multiple rotary cam 30 can be rotated by handle 16 in counterclockwise direction, as viewed from the rear of the machine, toward the numeral 2 position of handle 16. If, however, card 60 is not properly punched with selected validating holes 62—for which the machine is specially set—then the code sensing mechanisms of FIGS. 15 to 17, and FIGS. 13, 14 and 18 will cause abutment members 76 and 78 to come into engagement and stop the voting operation even before the spindles 18 are unlocked and a ballot may be cast. Likewise, if a card 60 is inserted which had been previously used for voting and therefore has a circular cancelation hole 64, this will also result in engagement of the abutment members 76 and 78 of the hole sensing mechanism of FIGS. 7 to 10. Since the voting operation cannot proceed in this situation, the handle 16 must be returned to the number 1 position thereof and the invalid card removed.

If a valid card 60 is inserted in receptacle 14, abutment members 76 and 78 will be moved out of alignment and the handle 16 rotated to the numeral 3 position thereof. At the same time, the card receptacle has been shifted from its original position to the opposite extreme position; for example, from the position of FIG. 7 to the position of FIG. 10. This last mentioned movement results in a circular cancelation hole 64 (see FIG. 31) being punched in card 60 by the punch 68 of FIG. 10.

Between the numeral 1 position and the numeral 3 position of the handle 16, the follower 52 of FIG. 6 rides on a high camming surface 51 and the voting spindles 18 are locked by ladder 48. When handle 16 reaches the numeral 3 position of FIG. 1, the butterfly plates 20 are free to rotate with their associated spindles 18 if the voter makes a selection by turning the voting keys 12 of his choice in clockwise direction as viewed frontally in FIG. 1. Follower 52 is now movable into the radially extending slot 53 of cam 32, to the position of FIG. 5, by the now unlocked ladder 48, when a rung 46 receives an upward force from a pin 44 as a voting key 12 is turned to move its spindle 18 to voted position.

After the voter has completed his selections, he cannot move handle 16 back to numeral 1 position because follower 52 locks cam 34 against reverse movement, and he must register his ballot by moving voting handle 16 clockwise from the numeral 3 position to the numeral 5 position thereof. And, in order to ensure that no manipulation of the voting keys 12 is possible, as the standard counters 42 are being shifted and rectangular record holes 65 are being punched in card 60, the spindles 18 are held in their voted and unvoted positions. This is accomplished by the rotation of cam 32 driving the spindle lock plates 114 rightward into securing engagement with the pins 44 of the butterfly plates 20.

Figure 11:
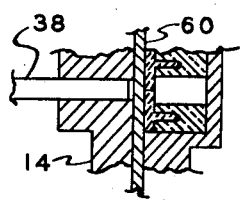
FIG. 11 is similar to FIG. 9 but showing the positions of the parts when a previously punched and, hence, invalid date card has been presented and detected.
Figure 12:
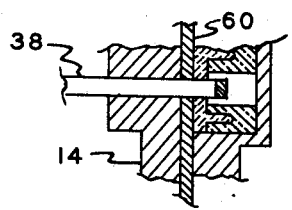
FIG. 12 is similar to FIG. 11 but showing the positions of the parts when an unpunched and, hence, valid card is presented to the machine.

By the time handle 16 has reached the numeral 4 position thereof, the record holes 65 have been punched by the leftward movement of card receptacle 14, as shown in the sequence of FIGS. 11 and 12. Also, the ballot is registered on the standard counters 42. Further movement of handle 16 in the same direction results in the lock plates 114 releasing pins 44 and their associated spindles 18. Meanwhile, follower 52 rides on the camming surface of groove 50 in cam 32 and the resulting camming action and transmission of motion through lever 54, link bar 56, and bell crank 58 shifts ladder 48 downwardly. This downward shifting movement of ladder 48 causes the rungs 46 thereof to move the pins 44 of butterfly plates 20 downwardly, whereby the voting keys 12 are returned to their unvoted position and secured.

I claim:
1. In combination,
a vote registering mechanism including
a shaft 28,
means 16 for rotating said shaft 28,
an abutment member 106 rotatably mounted on said shaft 28 and extending therefrom in radial direction,
structure defining a card receptacle 14 and having a transverse slot 86 formed therein,
a sensing element 88 movable in an arcuate path in said slot 86,
means 102 biasing said sensing element 88 into said slot 86 so as to position said element 88 in said card receptacle 14,
a blocking element 104 connected to said sensing element 88 and being movable therewith into and out of the path of said abutment member 106, said blocking element 104 being in the path of said abutment member 106 when said sensing element 88 is in one position in said receptacle 14 and being out of the path of said abutment member 106 when said sensing element 88 is out of said one position,
said sensing element 88 being movable against the bias of said biasing means 102 out of said one position when a card 60 is inserted into said receptacle 14, whereby said vote registering mechanism is rendered operable by the insertion of a card 60 into said receptacle 14 is movable in axial direction away from said about an axis, said structure defining said card receptacle 41 is movable in axial direction away from said sensing element 88 so as to withdraw said sensing element 88 from said slot 86 in axial direction, whereby the resistance of said card 60 to the bias of said biasing means 102 is removed upon withdrawal of said sensing element 88 from said slot 86 and said sensing element 88 is returned to said one position.

2. The combination recited in claim 1 including a support 92 for said sensing element 8, and wherein said sensing element is movable in axial direction relative to said support 92, and second biasing means 98 biasing said sensing element 88 in axial direction toward said card receptacle 14.

3. In combination,
a shaft 28,
means for rotating said shaft 28,
an abutment member 106 rotatable with said shaft 28 and extending therefrom in radial direction,
structure defining a card receptacle 14,
a sensing element 88, a blocking element 104 connected to said sensing element 88, means 102 biasing said sensing element 88 into a first position within said card receptacle 14, said blocking element 104 being movable into and out of the path of said abutment member 106, said blocking element 104 being in the path of said abutment member 106 when said sensing element 88 is in the first position and being out of the path of said abutment member 106 when said sensing element 88 is out of said first position, said sensing element 88 being movable against the bias of said biasing means 102 out of said first position when a card 60 is inserted into said receptacle 14 whereby said blocking element 104 is moved out of the path of said abutment member 106 and said shaft 28 is rotatable, means for moving said card receptacle 14 away from said sensing element 88 incident to rotation of said shaft 28 so as to disengage said card 60 from said sensing element and thereby return said sensing element 88 to first position under the bias of said biasing means 102, said blocking element 104 being repositioned in the path of said abutment member 106 upon the return of said sensing element 88 to first position, so as to limit the rotational movement of said shaft 28.

4. The combination in a voting machine comprising:
a shaft 28,
a rotary cam 32 rotatably mounted on said shaft 28 so as to be driven thereby,
voting keys 12,
a mechanism 48 operable by said cam 32, said mechanism 48 locking said keys 12 in a first rotary position of said cam 32 and unlocking said keys 12 in a second rotary position of said cam 32,
structure defining an elongated receptacle 14 for a data card 60, said receptacle 14 being movable transverse to the longitudinal extent of said receptacle 14 first in one direction and then oppositely in a second direction,
said receptacle structure 14 having a bore 66 therein extending in the direction in which said receptacle 14 is movable at least beyond the position in which said card 60 is held,
a punch 68 slidable in said bore 66 relative to said receptacle 14 for punching a hole in said card 60,
a passageway in said punch 68 extending in the direction of said bore 66,
a sensing pin 70 in said passageway 66 extendible beyond said punch 68 in said one direction and retractable so as to be coextensive with said punch 68,
a pivotally mounted arm 72 carrying said sensing pin 70,
biasing means 74 biasing said sensing pin 70 in said one direction beyond said punch 68,
abutment members 76 and 78 on the respective arm 72 and the card receptacle structure 14 being normally in registry when said pin 70 extends beyond said punch 68 in said one direction,
movement of said structure 14 with a card 60 therein in said second direction toward said sensing pin 70 bringing that portion of said card 60 in alignment with said pin 70 into engagement with said pin 70 if said card portion is imperforate, thereby moving said pin 70 into coextensive relation to said punch 68 and moving the abutment members 76 and 78 out of registry and extending said punch 68 through said card portion so as to punch a hole 64 therein, and permitting said cam 32 to be advanced to the second rotary position thereof for unlocking said keys 12,
and movement in second direction of structure 14 having a card 60 with a registering hole 64 therein causing said sensing pin 70 to extend through said hole 64 whereby said abutment members 76 and 78 are maintained in registry and engage prior to said cam being simultaneously advanced to second rotary position, thereby halting the operation of said voting machine before said keys 12 are unlocked.

5. The combination in a voting machine comprising:
a shaft 28
means 16 for rotating said shaft 28,
a cam 30 driven by said shaft 28,
an abutment member 106 on said cam 30,
structure defining a card receptacle 14,
voting keys 12 normally in unselected position and being movable to selected position,
a sensing element 88 responsive to the insertion of a card 60 in said receptacle 14 for unlocking said cam 30 for movement,
means moving said receptacle 14 first in one direction and then in a second direction incident to the rotation of said shaft 28,
means normally locking said voting keys 12 against movement and being actuated by said cam 30 to unlock said voting keys 12 incident to movement of said receptacle 14 in said one direction.
a card punch member 38 for each key 12,
said card punch members 38 being normally retracted and being moved by associated keys 12 in selected position in one direction so as to punch holes in said card 60 corresponding to those of said keys 12 moved to selected position,
means 114 operated by said cam 32 for holding said keys 12 and punch members 38 in their respective selected or unselected positions as said receptacle 14 moves in second direction and releasing said keys 12 and punch member 38 after said receptacle 14 returns to original position,
said locking means 48 being operated by said cam 30 to return said keys 12 and punch members 38 to original position subsequent to their release by said holding means 114,
said cam locking mechanism further including a blocking element 104 and being responsive to movement of said receptacle 14 in said one direction for moving said blocking element 104 in the path of movement of the abutment member 106 on said cam 34 in order to limit the rotational movement of said shaft 28.

6. The combination in a voting machine comprising:
a shaft 28,
means 16 for rotating said shaft 28,
structure defining a card receptacle 14,
voting keys 12,
a sensing element 88 responsive to the insertion of a card 60 in said receptacle 14 for releasing said shaft 28 for rotation,
means moving said receptacle 14 first in one direction and then oppositely in a second direction incident to the rotation of said shaft 28,
a card inspection mechanism including stop members 76, 78 blocking movement of said receptacle 14 in said one direction and hole sensing means 70 responsive to a predetermined punched code on said card 60 for moving said stop members 76, 78 out of alignment and thereby permit movement of said receptacle 14 in said one direction,
means 48 normally locking said voting keys 12 and unlocking said voting keys 12 incident to movement of said receptacle 14 in said one direction,
card punch members 38 normally retracted and being movable by said keys 12 to punch holes in said card 60 corresponding ot those of said keys 12 moved to selected position,
means 114 holding said keys 12 in position as said card 60 is punched and thereafter releasing said keys 12 and punch members 38,
said locking means 48 returning said keys 12 and punch members 38 to original position subsequent to their release by said hold means 114.

7. The combination in a voting machine comprising:
a shaft 28,
a handle 16 for manually rotating said shaft 28,
a rotary cam 30 mounted on said shaft 28 for rotation therewith,
an abutment member 106 on said cam 30 projecting radially outwardly therefrom,
structure defining a card receptacle 14,
voting keys 12,
a cam locking mechanism including a sensing element 88 responsive to the insertion of a card 60 in said receptacle 14 for unlocking said cam 30 and releasing said shaft 28 for rotation,
means connecting said receptacle 14 in driving relation to said shaft 28 for reciprocating movement first in one direction and then in a second direction incident to the rotation said shaft 28,
a card inspection mechanism including stop members 76, 78 positioned to engage and block movement of said receptacle 14 in said one direction and having hole sensing means 70 responsive to a predetermined punched code on said card 60 for moving said stop members 76, 78 out of alignment and thereby permitting movement of said receptacle 14 in said one direction,
means 48 locking said voting keys 12 against movement and being moved by said cam 30 to unlock said voting keys 12 and permit selected movement thereof incident to movement of said receptacle 14 in said one direction,
a card punch member 38 for each key 12,
said card punch members 38 associated with keys 12 moved to selected position being moved in said one direction so as to be in the path of movement of said card 60 as said card receptacle 14 moves in second direction whereby in said card 60 holes are punched corresponding to those of said keys 12 moved to selected position,
means 114 operated by said cam 32 for holding said keys and punch members 38 in their respective selected or unselected positions as said receptacle 14 and card 60 are movable in second direction and releasing said keys 12 and punch members 38 after said receptacle 14 returns to original position,
said locking means 48 being operated by said cam 30 to return said keys 12 and punch members 38 to original position subsequent to their release by said holding means 114,
said cam locking mechanism further including a blocking element 104 and being responsive to movement of said receptacle 14 in said one direction for moving said blocking element 104 in the path of movement of the abutment member 106 on said cam 34 so as to limit the rotational movement of said shaft 28.

8. In a voting machine, the combination of
a plurality of vote selection keys,
said keys movable from a first position to a second position;
a card punching mechanism operably associated with the said keys,
said mechanism including hole punch members slidable within whole punch passageways;
a data card receiving receptacle containing the said sole punch passageways,
said receptacle having motion relative to the said keys;
a shaft in driving relation to the said receptacle;
said hole punch members and said passageways being relatively movable toward one another by the said shaft for punching a hole in a data card positioned in the said receptacle; and
a spring biased plunger yieldingly obstructing the said receptacles,
said plunger monitoring the operation of the said shaft.

9. In a voting machine, the combination of
a plurality of handles manually movable between a first position and a second position;
a movable hole punch operably associated with each of the said handles,
each said punch slidable within a bore,
each of said punches being normally retracted and being extendable by its associated handle further into its associated bore when the said handle is moved from the first position to the second position;
an elongated card receptacle containing the said bores,
said bores extending transversely to the longitudinal extent of the said card receptacle,
said card receptacle being movable in the same transverse direction as the said bores,
said movement being in a first direction away from said punches and then oppositely in a second direction towards the said punches;
and card punch operating means, said means moving said card receptacle in its said second direction when the said handles are in their said second positions.

10. In a voting machine, the combination of
a plurality of vote selection keys,
said keys movable from a first position to a second position;
a plurality of spindles respectively responsive to the said keys;
pin members adapted to the driven by the said spindles between first and second positions,
said positions corresponding to the first and second positions of the said keys;
a shaft;
a locking mechanism including a plate,
said locking mechanism adapted to be driven between first and second positions thereof by the said shaft,
said plate being provided with holes receiving said pin members,
said pin members being movable by said keys between first and second positions thereof in the first position of said plate, and the said plate in second position engaging said pin members in either their first or second positions to secure the said pin members in the engaged positions against movement to another position until said plate is returned to its first position.

11. The combination according to claim 10, wherein said plate 114 is driven first from first position to second position and then from second position to first position, and including:
a second mechanism 48 adapted to be driven by said shaft 28 for returning those of said pin members 44 and keys 12 in second position back to first position incident to movement of said shaft 28 beyond that movement which moves said plate 114 from its second position to its first position.

References Cited by the Examiner

UNITED STATES PATENTS

| | | | |
|---|---|---|---|
| 786,897 | 4/05 | Haynes | 235—54 |
| 995,351 | 6/11 | Keiper | 235—54 |
| 1,145,817 | 7/15 | Suck | 235—54 |
| 1,387,762 | 8/21 | Carroll et al. | 235—61.1 |
| 1,705,091 | 3/29 | Langford | 235—50 X |
| 2,195,848 | 4/40 | Carroll | 235—50 |
| 2,269,644 | 1/42 | Bratt | 235—27 |
| 2,826,365 | 3/58 | Shoup | 235—51 X |
| 3,104,805 | 9/63 | Holicky | 235—54 |

FOREIGN PATENTS 753,868  8/56  Great Britain.

LEO SMILOW, *Primary Examiner.*